United States Patent
So et al.

(10) Patent No.: US 7,664,455 B2
(45) Date of Patent: Feb. 16, 2010

(54) TELEPHONE SIGNAL CANCELLATION CIRCUIT, DIGITAL BROADCASTING RECEPTION CIRCUIT AND PORTABLE DIGITAL BROADCASTING RECEPTION APPARATUS

(75) Inventors: Won Wook So, Kyungki-Do (KR); Hak Sun Kim, Daejeon (KR); Boo Dong Kwak, Kyungki-Do (KR); Won Tae Choi, Kyungki-Do (KR); Joo Yul Ko, Kyungki-Do (KR)

(73) Assignee: Samsung Electro-Mechanics Co., Ltd., Suwon, Kyungki-Do (KR)

(*) Notice: Subject to any disclaimer, the term of this patent is extended or adjusted under 35 U.S.C. 154(b) by 471 days.

(21) Appl. No.: 11/565,522

(22) Filed: Nov. 30, 2006

(65) Prior Publication Data

US 2007/0207768 A1    Sep. 6, 2007

(30) Foreign Application Priority Data

Feb. 17, 2006    (KR)    .................... 10-2006-0015434

(51) Int. Cl.
*H04B 1/10*    (2006.01)
*H04B 17/00*    (2006.01)

(52) U.S. Cl. ................ 455/3.01; 455/67.13; 455/278.1; 455/283; 455/296

(58) Field of Classification Search ....... 455/3.01–3.02, 455/501–506, 63.1, 65, 67.13, 278.1, 283–285, 455/295, 296; 375/346–347
See application file for complete search history.

(56) References Cited

U.S. PATENT DOCUMENTS

| | | | | |
|---|---|---|---|---|
| 5,812,673 A | * | 9/1998 | Nohara et al. ................ | 381/13 |
| 5,974,101 A | * | 10/1999 | Nago ......................... | 375/350 |
| 5,982,901 A | * | 11/1999 | Kane et al. ................... | 381/13 |
| 6,229,359 B1 | | 5/2001 | Chesavage | |
| 6,539,202 B1 | | 3/2003 | Yamashita et al. | |
| 6,819,911 B2 | * | 11/2004 | Clelland et al. ............. | 455/296 |
| 7,003,094 B2 | * | 2/2006 | Fischer et al. .......... | 379/406.01 |
| 2006/0018286 A1 | | 1/2006 | Ozeki et al. | |
| 2006/0170827 A1 | * | 8/2006 | Suda et al. .................. | 348/730 |
| 2007/0173282 A1 | * | 7/2007 | Noda et al. .............. | 455/550.1 |

FOREIGN PATENT DOCUMENTS

| | | |
|---|---|---|
| JP | 62-263723 A | 11/1987 |
| JP | 07-177047 A | 7/1995 |
| JP | 11-308143 A | 11/1999 |
| JP | 2000-174645 A | 6/2000 |
| JP | 2003-507954 A | 2/2003 |
| JP | 2003-244015 A | 8/2003 |
| JP | 2004-282432 A | 10/2004 |
| WO | 01/15329 | 3/2001 |

* cited by examiner

*Primary Examiner*—Simon D Nguyen
(74) *Attorney, Agent, or Firm*—Lowe Hauptman Ham & Berner (57) ABSTRACT

A telephone signal cancellation circuit, a digital broadcasting reception circuit and a portable digital broadcasting reception apparatus is provided. The telephone signal cancellation circuit, includes a signal coupler for separating a part of a reception signal, a telephone signal selection filter for passing a telephone signal among signals from the signal coupler, a phase shifter for performing phase inversion on the telephone signal among the signals from the telephone signal selection filter, and a combiner for combining the signal from the phase shifter and the reception signal, and canceling the telephone signal included in the reception signal.

28 Claims, 6 Drawing Sheets

Prior art
FIG. 1

Prior art
FIG. 2 m2
Frequency:915.0MHz
dB(S(2,1))=-42.428 m1
Frequency:880.0MHz
dB(S(2,1))=-41.009

TELEPHONE SIGNAL CANCELLATION CIRCUIT, DIGITAL BROADCASTING RECEPTION CIRCUIT AND PORTABLE DIGITAL BROADCASTING RECEPTION APPARATUS

RELATED APPLICATION

The present application is based on, and claims priority from, Korean Application Number 2006-15434, filed Feb. 17, 2006, the disclosure of which is hereby incorporated by reference herein in its entirety.

BACKGROUND OF THE INVENTION

1. Field of the Invention

The present invention relates to a portable digital broadcasting reception apparatus adopting digital broadcasting reception and telephone functions, and more particularly, to a telephone signal cancellation circuit, a digital broadcasting reception circuit and a portable digital broadcasting reception apparatus for preventing reception sensitivity from being degraded due to a high powered telephone signal by blocking inflow of an interference noise signal, that is, the telephone signal such as a Global System for Mobile Communication (GSM) telephone and a mobile telephone signal, when the digital broadcasting such as a digital video broadcasting handheld (DVB-H) is received, for improving reception performance and productivity of digital broadcasting, and for increasing a DVB-H maximum reception frequency band limited by the interference noise signal up to 860 MHz.

2. Description of the Related Art

Recently, as digital-broadcasting has been receiving attention, various researches have been in progress for developing a Digital Multimedia Broadcasting (DMB) technology in Korea and some countries, and for developing a digital video broadcasting (DVB) technology in Europe.

The DVB is a shortened word of Digital Video Broadcasting and includes a digital video broadcasting terrestrial (DVB-T) for receiving broadcasting from a broadcasting station at a fixed device of home or office and a digital video broadcasting handheld (DVB-H) considering low power, mobility and portability of a mobile phone or a portable video device.

As the mobile terminal is multiplexed, a mobile phone having the DVB-H is about to be launched. When one terminal supports at least two functions such as Global System for Mobile Communication (GSM)/general packet radio service (GPRS) and the DVB-H, proper response against reception sensitivity deterioration of each module by a mutual interference affect is required.

Also, the entire original DVB-H reception bandwidth ranging about 470 MHz to 860 MHz cannot be used due to the interference noise signal. That is, the DVB-H reception bandwidth is limited to about 470 MHz to 750 MHz, which corresponds to a partial frequency band of the entire reception bandwidth of DVB-H.

Figure 1:
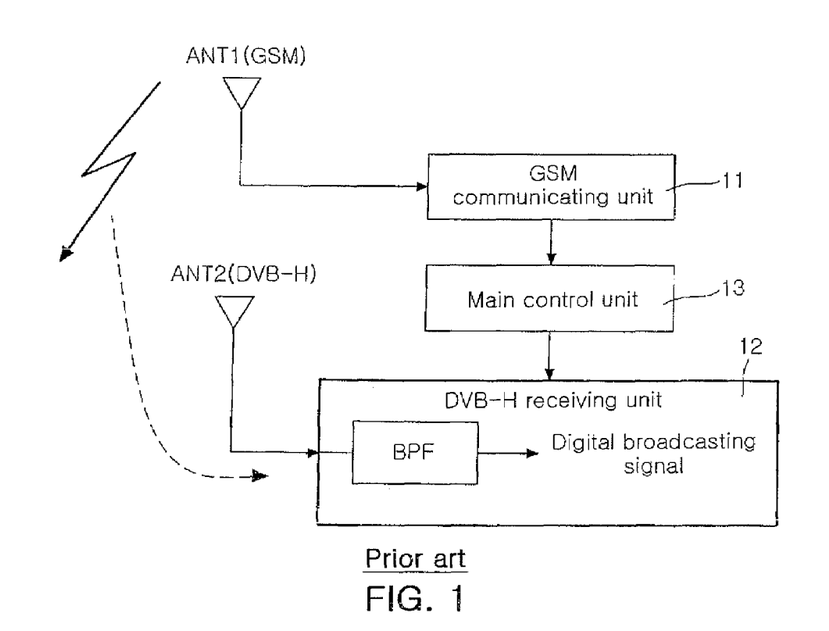
FIG. 1 is a conventional DVB-H GSM mobile phone.

FIG. 1 is a conventional DVB-H GSM mobile phone.

Referring to FIG. 1, the conventional DVB-H GSM mobile phone includes a GSM communicating unit 11 for transmitting/receiving a GSM signal of about 900 MHz where TX ranges 880 MHz to 915 MHz and RX ranges 925 MHz to 960 MHz, a DVB-H receiving unit 12 for receiving a DVB-H broadcasting signal having a band ranging about 470 MHz to 750 MHz, and a main control unit 13 for controlling a transmitting/receiving operation of the GSM communicating unit 11 and a receiving operation of the DVB-H receiving unit 12.

A DVB-H broadcasting frequency band and a GSM-TX frequency of the conventional DVB-H GSM mobile phone is described with reference to FIG. 2.

Figure 2:
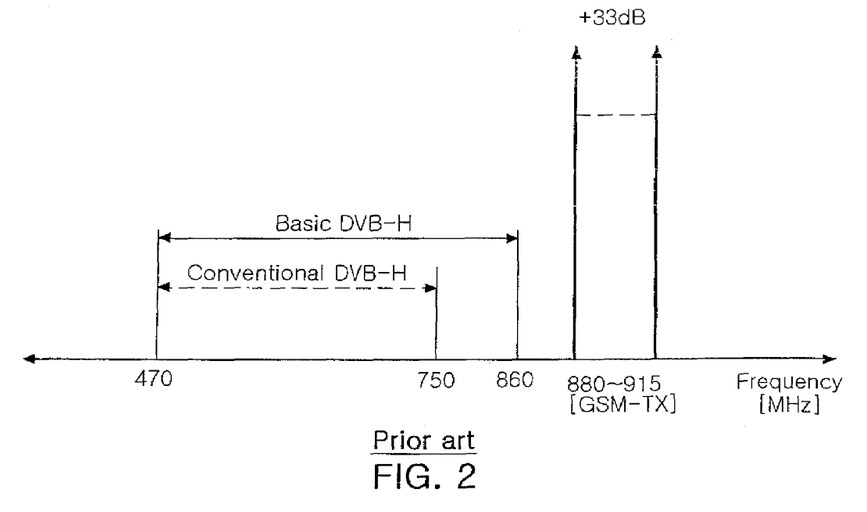
FIG. 2 shows a spectrum of the DVB-H broadcasting frequency band, the GSM-TX frequency and a basic DVB-H broadcasting frequency band of the conventional DVB-H GSM mobile phone.

FIG. 2 shows a spectrum of the DVB-H broadcasting frequency band, the GSM-TX frequency band and a basic DVB-H broadcasting frequency band of the conventional DVB-H GSM mobile phone. The frequency band of the DVB-H broadcasting ranges about 470 MHz to 750 MHz and the GSM-TX frequency band ranges about 880 MHz to 915 MHz. The basic DVB-H broadcasting frequency band required for a typical DVB-H system ranges about 750 MHz to 860 MHz.

In the conventional DVB-H GSM mobile phone, a situation that a GSM telephone call is performed through the GSM communicating unit 11 for receiving digital broadcasting through the DVB-H receiving unit 12 may be generated. Also, a situation that a telephone call is performed through a GSM communicating unit of other DVB-H GSM mobile phone in a close distance while receiving digital broadcasting through the DVB-H receiving unit 12.

The GSM communicating unit 11 amplifies power of a GSM-TX signal into high power of about +33 dBm through an internal power amplifier. Accordingly, when the GSM-TX signal of the high power come to the DVB-H receiving unit 12, the GSM-TX signal operates for the reception signal of the DVB-H broadcasting as noise and an input end of the DVB-H receiving unit 12 includes a band-pass filter (BPF).

However, when a band ranging about 470 MHz from 860 MHz, i.e., a basic DVB-H reception bandwidth, is set up as a pass band based on the band-pass filter, a GSM-TX signal cannot be attenuated enough. Accordingly, the DVB-H reception band ranging 750 MHz to 860 MHz cannot be used and only the reception band ranging 470 MHz to 750 MHz of the conventional DVB-H reception apparatus is limitedly used.

The band-pass filter passes the frequency band of the digital broadcasting ranging about 470 MHz to 750 MHz, includes the GSM-TX frequency band and blocks the frequency band larger than about 800 MHz.

Although the band-pass filter included in the DVB-H receiving unit 12 of the conventional DVB-H GSM mobile phone blocks the GSM-TX signal, attenuation of the GSM-TX signal by the band-pass filter is not enough. Therefore, there is a problem that the GSM-TX signal flows to the DVB-H receiving unit 12 as noise and deteriorates the reception sensitivity of the DVB-H broadcasting.

A characteristic that the GSM-TX frequency band is attenuated by the conventional band-pass filter will be described with reference to FIG. 3.

Figure 3:
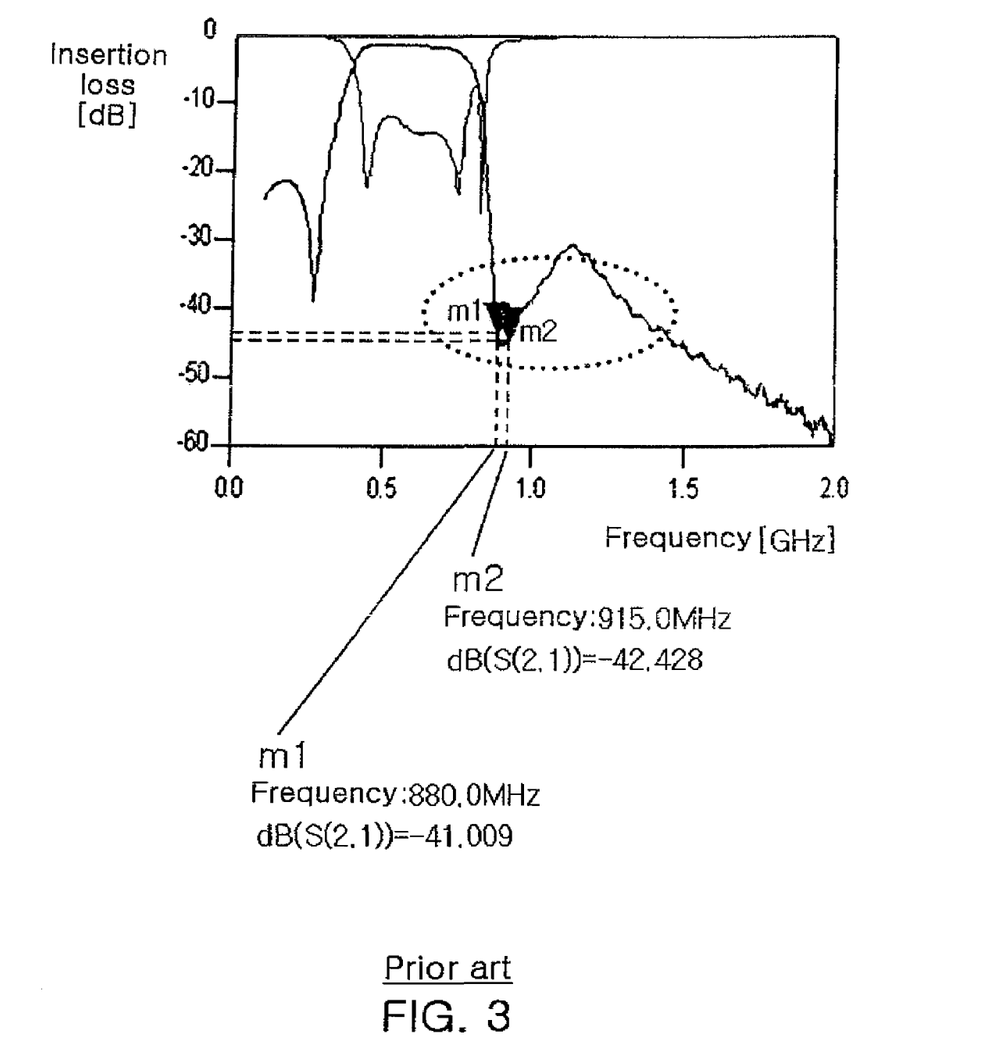
FIG. 3 is a graph illustrating the frequency characteristics of the conventional reception apparatus of FIG. 1.

FIG. 3 is a graph showing the frequency characteristics of the conventional reception apparatus of FIG. 1.

m1 shows that an attenuation rate with respect to 880 MHz in the GSM-TX frequency band is about −41.009 and m2 shows that an attenuation rate with respect to a frequency component of 915 MHz in the GSM-TX frequency band is about −42.428 dB.

Although attenuation performance of larger than −45 dB with respect to the GSM-TX frequency band is required to satisfy a specification of the DVB-H reception apparatus, there is a problem that the conventional DVB-H GSM mobile phone using the band-pass filter does not satisfy the specification of the DVB-H reception apparatus.

Also, if the bandwidth of the band-pass filter is designed in a range of 470 MHz to 860 MHz to acquire the conventional DVB-H reception band, the attenuation performance for the GSM-TX frequency band is further deteriorated, disadvantageously.

SUMMARY OF THE INVENTION

Accordingly, the present invention is directed to a telephone signal cancellation circuit, a digital broadcasting reception circuit and a portable digital broadcasting reception apparatus that substantially obviates one or more problems due to limitations and disadvantages of the related art.

An object of the present invention is to provide a telephone signal cancellation circuit, a digital broadcasting reception circuit and a portable digital broadcasting reception apparatus which can prevent reception sensitivity deterioration of digital broadcasting by a telephone signal of high power by blocking inflow of the telephone signal including a Global System for Mobile Communication (GSM) telephone or a mobile telephone signal, i.e., an interference noise signal when the digital broadcasting such as digital video broadcasting handheld (DVB-H) is received, improve reception performance and productivity of digital broadcasting, and increase a DVB-H maximum reception frequency band limited by the interference noise signal by 860 MHz.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and according to the purpose of the invention, as embodied and broadly described herein, a telephone signal cancellation circuit, a digital broadcasting reception circuit and a portable digital broadcasting reception apparatus.

According to an aspect of the present invention, there is provided a telephone signal cancellation circuit, including: a signal coupler for separating a part of a reception signal; a telephone signal selection filter for passing a telephone signal among signals from the signal coupler; a phase shifter for performing phase inversion on the telephone signal among the signals from the telephone signal selection filter; and a combiner for combining the signal from the phase shifter and the reception signal, and canceling the telephone signal included in the reception signal.

The telephone signal cancellation circuit may further include a noise cancellation controller for controlling the cancellation of the telephone signal included in the reception signal based on a pre-set transmission channel among telephone frequency bands.

The telephone signal selection filter may include a variation filter for setting up a pass band having a frequency of the pre-set transmission channel as a mean frequency by control of the controller.

The phase shifter may perform phase inversion on a frequency signal corresponding to the pre-set transmission channel among the signals from the telephone signal selection filter by control of the controller.

The telephone signal cancellation circuit may further include a power detector for detecting power of the telephone signal among output signals of the combiner.

In addition, the telephone signal cancellation circuit may further include an automatic gain control (AGC) amplifier for amplifying the signal from the phase shifter based on the power of the telephone signal detected by the power detector and outputting the signal to the combiner.

The noise cancellation controller may control phase shift in a frequency where a power value of the telephone signal is the minimum by changing a phase shift frequency of the phase shifter while monitoring the power of the telephone signal from the power detector.

The telephone signal may be a GSM transmission signal that is a frequency band ranging about 880 MHz to 915 MHz.

According to another aspect of the present invention, there is provided a digital broadcasting reception circuit, including: a band-pass filter for passing a digital broadcasting signal among reception signals: a signal coupler for separating a part of a reception signal; a telephone signal selection filter for passing a telephone signal among signals from the signal coupler; a phase shifter for performing phase inversion on the telephone signal among the signals from the telephone signal selection filter; a combiner for combining a signal from the phase shifter and a reception signal from a band-pass filter and canceling the telephone signal included in the reception signal; and a Radio Frequency (RF) processor for receiving the digital broadcasting signal from the combiner.

The digital broadcasting reception circuit may further include a noise cancellation controller for controlling the cancellation of the telephone signal included in the reception signal based on a pre-set transmission channel among telephone frequency bands.

The telephone signal selection filter may include a variation filter for setting up a pass band having a frequency of the pre-set transmission channel as a mean frequency by control of the controller.

The phase shifter may perform phase inversion on a frequency signal corresponding to the pre-set transmission channel among the signals from the telephone signal selection filter by control of the controller.

The digital broadcasting reception circuit may further include a power detector for detecting power of the telephone signal among output signals of the combiner.

The digital broadcasting reception circuit may further include an AGC amplifier for amplifying the signal from the phase shifter based on the power of the telephone signal detected by the power detector and outputting the signal to the combiner.

The noise cancellation controller may control phase shift in a frequency where a power value of the telephone signal is the minimum by changing a phase shift frequency of the phase shifter while monitoring power of the telephone signal from the power detector.

The telephone signal may be a GSM transmission signal that is a frequency band ranging about 880 MHz to 915 MHz.

The digital broadcasting signal may be a DVB-H signal which is a frequency band ranging about 470 MHz to 860 MHz.

According to another aspect of the present invention, there is provided a portable digital broadcasting reception apparatus, including: a main control unit for controlling a telephone call and digital broadcasting reception; a telephone circuit for transmitting/receiving a telephone signal through a first antenna by control of the controller; and a telephone signal cancellation circuit including a telephone signal cancellation circuit for receiving a digital broadcasting signal through a second antenna by control of the controller, performing phase inversion on the telephone signal flowing through the second antenna, combining the telephone signal with a reception signal through the second antenna, and canceling the telephone signal.

The digital broadcasting reception circuit may further include a band-pass filter for passing a digital broadcasting signal among the reception signals from the second antenna to the telephone signal cancellation circuit; and a RF processor for receiving the digital broadcasting signal from the band-pass filter.

The telephone signal cancellation circuit may include a signal coupler for separating a part of the reception signal through the second antenna; a telephone signal selection filter for passing the telephone signal among the signals from the signal coupler; a phase shifter for performing phase inversion on the telephone signal among the signals from the telephone signal selection filter; and a combiner for combining the signal from the phase shifter and the reception signal from the band-pass filter, and canceling the telephone signal included in the reception signal.

The portable digital broadcasting reception apparatus may further include a noise cancellation controller for controlling the cancellation of the telephone signal included in the reception signal based on a pre-set transmission channel among the telephone frequency bands.

The telephone signal selection filter may include a variation filter for setting up a pass band having a frequency of the pre-set transmission channel as a mean frequency by control of the controller.

The phase shifter may perform phase inversion on a frequency signal corresponding to the pre-set transmission channel among the signals from the telephone signal selection filter by control of the controller.

The portable digital broadcasting reception apparatus may further include a power detector for detecting power of the telephone signal among output signals of the combiner.

In addition, the portable digital broadcasting reception apparatus may further include an AGC amplifier for amplifying the signal from the phase shifter based on power of the telephone signal detected by the power detector and outputting the signal to the combiner.

The noise cancellation controller may control phase shift in a frequency where a power value of the telephone signal is the minimum by changing a phase shift frequency of the phase shifter while monitoring the power of the telephone signal from the power detector.

The telephone signal may be a GSM transmission signal that is a frequency band ranging about 880 MHz to 915 MHz.

The digital broadcasting signal may be a DVB-H signal which is a frequency band ranging about 470 MHz to 860 MHz.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 4:
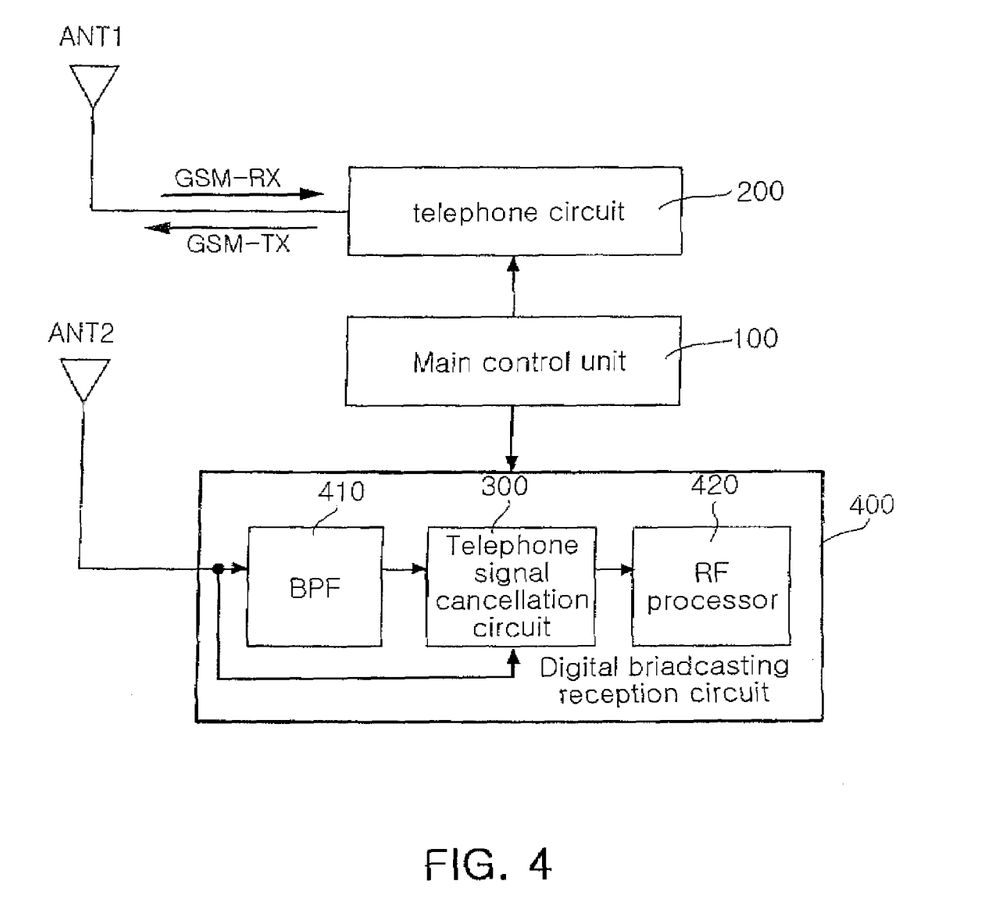
FIG. 4 is a block diagram showing a portable digital broadcasting reception apparatus according to an embodiment of the present invention.

FIG. 4 is a block diagram illustrating a portable digital broadcasting reception apparatus according to an embodiment of the present invention.

The portable digital broadcasting reception apparatus of the present invention includes a main control unit 100 for controlling a telephone call and digital broadcasting reception, a telephone circuit 200 for transmitting/receiving a telephone signal through a first antenna (ANT1) by control of the control unit 100, and a digital broadcasting reception circuit 400 for receiving a digital broadcasting signal through a second antenna (ANT2) by control of the control unit 100.

The digital broadcasting reception circuit 400 includes a telephone signal cancellation circuit 300 which receives the digital broadcasting signal through the ANT2 by control of the control unit 100, performs phase inversion on the telephone signal flowing through the ANT2, and cancels the telephone signal with combined with the reception signal through the ANT2.

Also, the digital broadcasting reception circuit 400 includes a Radio Frequency (RF) processor 420 receiving the digital broadcasting signal from the telephone signal cancellation circuit 300.

When the digital broadcasting reception circuit 400 further includes a band-pass filter 410 passing the digital broadcasting signal of the reception signals from the ANT2 to the telephone signal cancellation circuit 300, the attenuation characteristic of the telephone signal can be improved.

Figure 5:
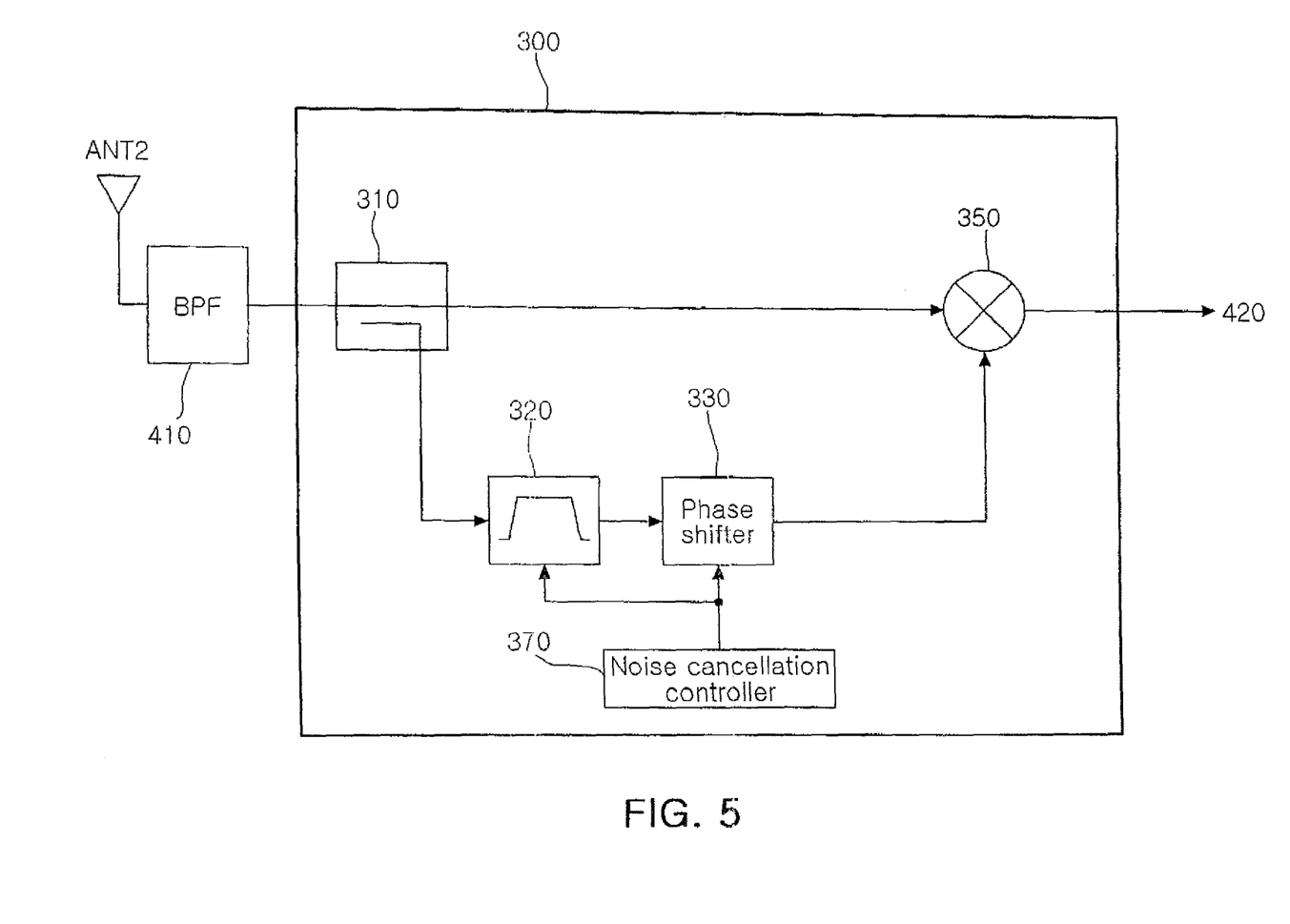
FIG. 5 shows a telephone signal cancellation circuit according to a first embodiment of the present invention.

FIG. 5 shows a telephone signal cancellation circuit according to a first embodiment of the present invention.

The telephone signal cancellation circuit 300 includes a signal coupler 310 for separating a part of the reception signal from the ANT2, a telephone signal selection filter 320 for passing the telephone signal among the signals from the signal coupler 310, a phase shifter 330 for performing phase inversion on the telephone signal among the signals from the telephone signal selection filter 320, a combiner 350 for combining the signal from the phase shifter 330 and the reception signal from the band-pass filter 410, and canceling the telephone signal included in the reception signal, and a noise cancellation controller 370 for controlling the cancellation of the telephone signal included in the reception signal.

The signal coupler 310 can be connected between the ANT2 and the band-pass filter 410 or connected to an output end of the band-pass filter 410.

Also, the noise cancellation controller 370 can control the cancellation of the telephone signal included in the reception signal based on a pre-set transmission channel among the telephone frequency bands.

As described above, the noise cancellation controller 370 controls variation of the pass band of the telephone signal selection filter 320 based on the pre-set transmission channel and controls variation of a phase shift mean frequency of the phase shifter 330.

Figure 6:
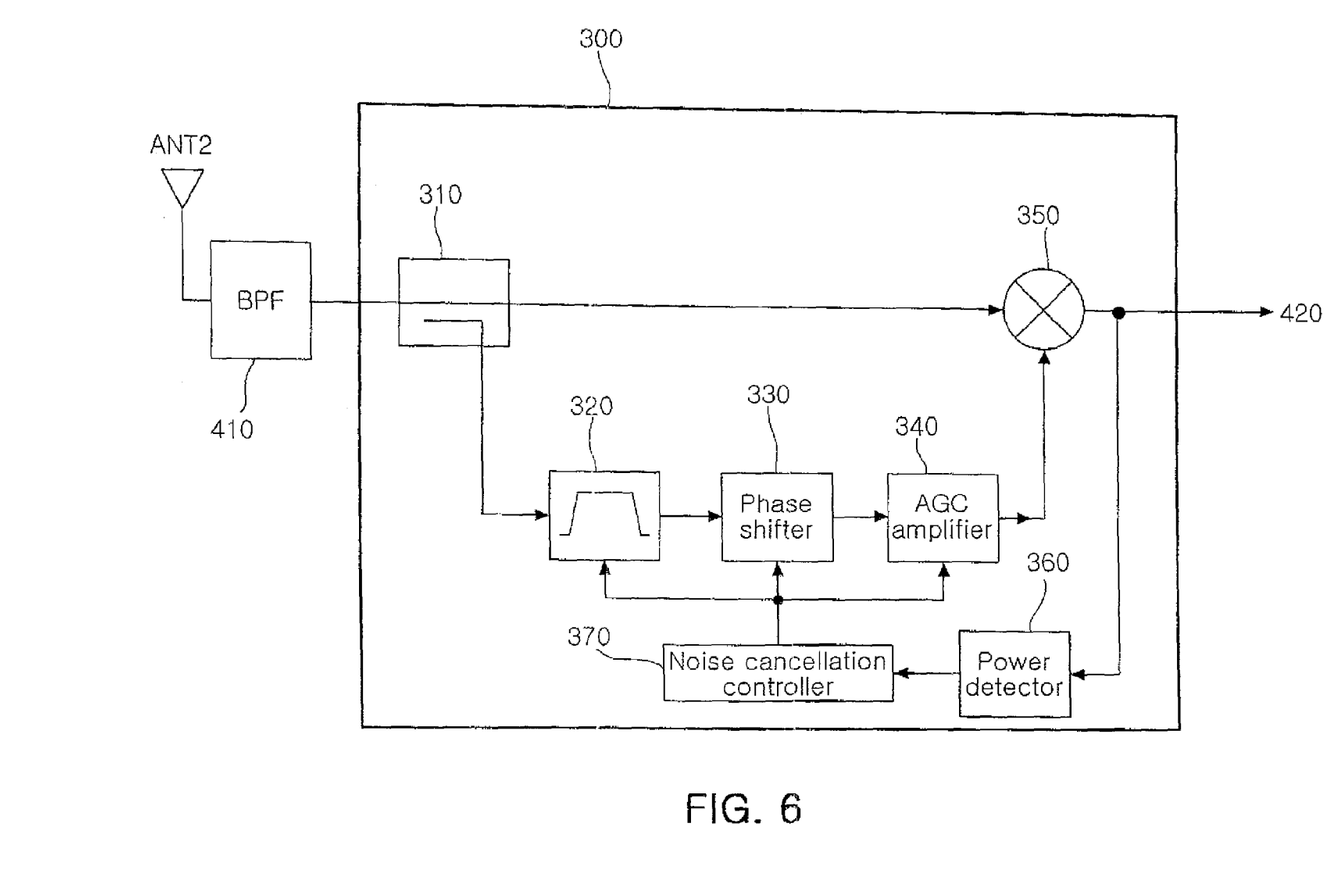
FIG. 6 shows a telephone signal cancellation circuit according to a second embodiment of the present invention.

FIG. 6 shows a telephone signal cancellation circuit according to a second embodiment of the present invention.

The telephone signal cancellation circuit 300 includes the signal coupler 310 for separating a part of the reception signal from the ANT2, the telephone signal selection filter 320 for passing the telephone signal among the signals from the signal coupler 310, a phase shifter 330 for performing phase inversion on the telephone signal among the signals from the telephone signal selection filter 320, an automatic gain control (AGC) amplifier 340 for amplifying the signal from the phase shifter 330 according to a gain control signal, the combiner 350 for combining the signal from the phase shifter 330 and the reception signal from the band-pass filter 410, and canceling the telephone signal included in the reception signal, a power detector 360 for detecting power of the telephone signal among output signals of the combiner 350, and a noise cancellation controller 370 for controlling the cancellation of the telephone signal included in the reception signal. The gain control signal of the AGC amplifier 340 is provided from the noise cancellation controller 370.

The signal coupler 310 can be connected between the ANT2 and the band-pass filter 410, or connected to the output end of the band-pass filter 410.

Also, the noise cancellation controller 370 can control the cancellation of the telephone signal included in the reception signal based on the pre-set transmission channel of the telephone frequency band. Also, the noise cancellation controller 370 can control phase shift in a frequency where a power value of the telephone signal is the minimum by changing a phase shift frequency of the phase shifter 330 while monitoring power of the telephone signal from the power detector 360.

As described above, the noise cancellation controller 370 can control the variation of the pass band of the telephone signal selection filter 320 based on the pre-set transmission channel, control the variation of the phase shift mean frequency of the phase shifter 330, and control a gain of the AGC amplifier 340 according to the power of the telephone signal from the power detector 360.

The telephone signal selection filter 320 may include a variation filter for setting up a pass band having the frequency of the pre-set transmission channel as a mean frequency by control of the noise cancellation controller 370.

The phase shifter 330 can perform phase inversion on a frequency signal corresponding to the pre-set transmission channel among the signals from the telephone signal selection filter 320 by control of the noise cancellation controller 370.

When the telephone circuit 200 of the present invention is a telephone circuit of a Global System for Mobile Communication (GSM) type, the telephone signal may correspond to a GSM transmission signal included in a frequency band ranging about 880 MHz to 915 MHz.

When the digital broadcasting reception circuit 400 of the present invention is a reception circuit of a digital video broadcasting handheld (DVB-H) type, the digital broadcasting signal corresponds to a DVB-H signal, which is a frequency band ranging about 470 MHz to 860 MHz.

In the above-mentioned portable digital broadcasting reception apparatus of the present invention, the pre-set transmission channel will be briefly described. Transmission channels, which are different from each other according to each region, are pre-set up in each base station of a telephone network such as the GSM and the pre-set transmission channel is detected and set up in each telephone terminal.

Accordingly, since each telephone terminal has pre-set transmission channel information, a frequency of the telephone signal to be cancelled can be exactly set up based on the transmission channel.

Figure 7:
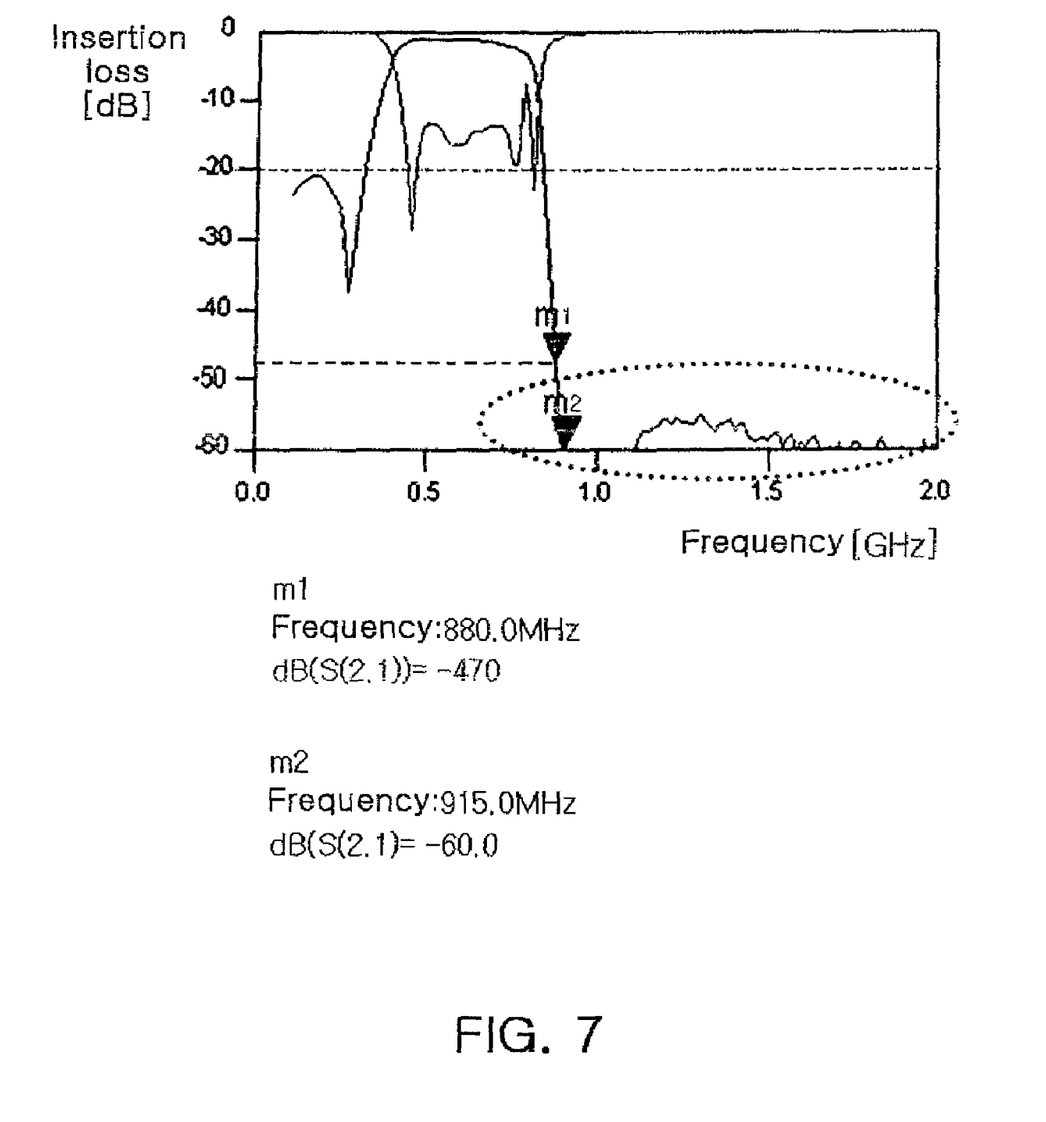
FIG. 7 shows a graph illustrating frequency characteristics of the reception apparatus according to an embodiment of the present invention.

FIG. 7 shows a graph illustrating frequency characteristics of the reception apparatus according to an embodiment of the present invention.

m1 shows that an attenuation rate with respect to a frequency component of 880 MHz among the GSM-TX frequency bands is about −47.0 dB, and m2 shows that an attenuation rate with respect to a frequency component of 915 MHz among the GSM-TX frequency bands is about −60.0 d.

An operation and effect of the present invention will be described in detail hereinafter with reference to the accompanying drawing.

When the portable digital broadcasting reception apparatus of the present invention is the DVB-H reception apparatus and a telephone circuit of a GSM type where GSM-TX ranges 880 MHz to 915 MHz and a digital broadcasting reception circuit of a DVB-H type ranging about 470 MHz to 750 MHz are adopted, the portable digital broadcasting reception apparatus of the present invention will be described with reference to FIGS. 4 to 7.

Referring to FIG. 4, in the portable digital broadcasting reception apparatus of the present invention, the main control unit 100 controls a telephone call of the telephone circuit 200 and digital broadcasting reception of the digital broadcasting reception circuit 400.

Accordingly, the telephone circuit 200 transmits/receives a telephone signal through the ANT1 by control of the control unit 100 and the digital broadcasting reception circuit 400 receives a digital broadcasting signal through the ANT2 by control of the main control unit 100.

The band-pass filter 410 of the digital broadcasting reception circuit 400 passes the digital broadcasting signal among the reception signals from the ANT2 to the telephone signal cancellation circuit 300. When the band-pass filter 410 is included, the telephone signal attenuation characteristic of the present invention can be improved.

The telephone signal cancellation circuit 300 cancels the telephone signal by performing phase inversion on the telephone signal flowing through the ANT2 and being combined with the reception signal through the ANT2, and outputs a signal where the telephone signal is cancelled to the RF processor 420.

The RF processor 420 receives and processes the digital broadcasting signal from the telephone signal cancellation circuit 300.

The above-mentioned telephone signal cancellation circuit 300 of the present invention can be realized in diverse forms and some examples of the diverse embodiments will be described with reference to FIGS. 5 and 6.

A telephone cancellation circuit according to an embodiment of the present invention is realized will be described with reference to FIGS. 5 and 6.

Referring to FIG. 5, the signal coupler 310 of the telephone signal cancellation circuit 300 separates a part of the reception signal from the ANT2 and outputs the part of the reception signal to the telephone signal selection filter 320. The telephone signal selection filter 320 outputs the telephone signal among the signals from the signal coupler 310 to the phase shifter 330. The phase shifter 330 performs phase inversion on the telephone signal among the signals from the telephone signal selection filter 320 and outputs the telephone signal to the combiner 350. Subsequently, the combiner 350 combines the signal from the phase shifter 330 and the reception signal from the band-pass filter 410, and cancels the telephone signal included in the reception signal.

The noise cancellation controller 370 of the telephone signal cancellation circuit 300 controls the cancellation of the telephone signal included in the reception signal. For example, the noise cancellation controller 370 can control the cancellation of the telephone signal included in the reception signal based on the pre-set transmission channel among the telephone frequency bands. That is, the noise cancellation controller 370 can control the variation of the pass band of the telephone signal selection filter 320 based on the pre-set transmission channel and control the variation of the phase shift mean frequency of the phase shifter 330.

Accordingly, the telephone signal selection filter 320 sets up the pass band having the frequency of the pre-set transmission channel as a mean frequency by control of the noise cancellation controller 370 and can exactly extract the telephone signal among the signals from the signal coupler 310 through the set-up pass band.

Also, the phase shifter 330 can perform phase inversion on a frequency signal corresponding to the pre-set transmission channel among the signals from the telephone signal selection filter 320 by control of the noise cancellation controller 370 and can exactly perform phase inversion on the telephone signal.

Referring to FIG. 6, the signal coupler 310 of the telephone signal cancellation circuit 300 separates a part of the reception signal from the ANT2 and outputs the part of the reception signal to the telephone signal selection filter 320. The telephone signal selection filter 320 outputs the telephone signal among the signals from the signal coupler 310 to the phase shifter 330. The phase shifter 330 performs phase inversion on the telephone signal among the signals from the telephone signal selection filter 320 and outputs the telephone signal to the AGC amplifier 340. The AGC amplifier 340 amplifies the signal from the phase shifter 330 according to the gain control signal and outputs the signal to the combiner 350. The combiner 350 combines the signal from the phase shifter 330 and the reception signal from the band-pass filter 410, and cancels the telephone signal included in the reception signal.

Subsequently, the power detector 360 of the telephone signal cancellation circuit 300 detects power of the telephone signal among the output signals of the combiner 350 and outputs the power of the telephone signal to the noise cancellation controller 370.

Accordingly, the noise cancellation controller 370 controls the cancellation of the telephone signal included in the reception signal, and more specifically, outputs a gain control signal, which controls the gain of the AGC amplifier 340 according to a power level detected by the power detector 360, to the AGC amplifier 340.

As described with reference to FIG. 6, the noise cancellation controller 370 can control the cancellation of the telephone signal included in the reception signal based on the pre-set transmission channel among the telephone frequency bands. In particular, the noise cancellation controller 370 can control phase shift in a frequency where a power value of the telephone signal is the minimum by changing the phase shift frequency of the phase shifter 330 while monitoring the power of the telephone signal from the power detector 360.

As described above, the noise cancellation controller 370 can control the variation of the pass band of the telephone signal selection filter 320 based on the pre-set transmission channel, control the variation of the phase shift mean frequency of the phase shifter 330, and control the gain of the AGC amplifier 340 based on the power of the telephone signal from the power detector 360.

As described with reference to FIG. 5, the telephone signal selection filter 320 may include a variation filter for setting up the pass band having the frequency of the pre-set transmission channel as a mean frequency by control of the noise cancellation controller 370. The phase shifter 330 can perform phase inversion on a frequency signal corresponding to the pre-set transmission channel among signals from the telephone signal selection filter 320 by control of the noise cancellation controller 370.

When the above-mentioned telephone signal cancellation circuit 300 of the present invention is used, m1 shows that an attenuation rate with respect to a frequency component of 880 MHz among the GSM-TX frequency bands is about −47.0 dB, and m2 shows that an attenuation rate with respect to a frequency component of 915 MHz among the GSM-TX frequency bands is about −60.0 d as shown in FIG. 7. Referring to m1 and m2, since the DVB-H reception apparatus has enough attenuation characteristic with respect to the GSM-TX signal ranging about 880 MHz to 915 MHz, the reception sensitivity of the digital broadcasting can be improved.

As described above, when the portable digital broadcasting reception apparatus adopting digital broadcasting reception and telephone functions receives the digital broadcasting such as the DVB-H, the present invention can prevent reception sensitivity deterioration of the digital broadcasting by the telephone signal of high power by blocking inflow of the telephone signal, i.e., the interference noise signal, such as the GSM telephone or the mobile telephone, and improve reception performance and productivity of the digital broadcasting.

To be specific, the portable digital broadcasting reception apparatus according to the present invention can cancel the interference noise signal such as the GSM telephone signal applied as a specific frequency band neighboring to the DVB-H reception band, and simplify a formation of the band-pass filter in an input block of the reception apparatus according to a cancellation level of the interference noise signal.

Also, the portable digital broadcasting reception apparatus according to the present invention can improve insertion loss and simultaneously acquire enough attenuation with respect to the telephone signal. Although an individual band-pass filter is not used, the present invention can cancel the telephone signal.

In addition, the portable digital broadcasting reception apparatus according to the present invention can improve productivity by improving an RF performance of a DVB-H reception module in the middle of development and acquiring a stable margin.

Moreover, the portable digital broadcasting reception apparatus according to the present invention can extend the reception bandwidth of the DVB-H reception module by 860 MHz, which is a basic DVB-H maximum reception module.

It will be apparent to those skilled in the art that various modifications and variations can be made in the present invention. Thus, it is intended that the present invention covers the modifications and variations of this invention provided they come within the scope of the appended claims and their equivalents.

What is claimed is:
1. A telephone signal cancellation circuit, comprising:
a signal coupler for separating a part of a reception signal;
a telephone signal selection filter for passing a telephone signal among signals in the part of the reception signal from the signal coupler;

a phase shifter for performing phase inversion on the telephone signal from the telephone signal selection filter; and a combiner for combining the telephone signal from the phase shifter with the reception signal, and canceling the telephone signal included in the reception signal.

2. The cancellation circuit of claim 1, further comprising:
a noise cancellation controller for controlling the cancellation of the telephone signal included in the reception signal based on a pre-set transmission channel among telephone frequency bands.

3. The cancellation circuit of claim 2, wherein the telephone signal selection filter includes a variation filter for setting up a pass band having a frequency of the pre-set transmission channel as a mean frequency by control of the controller.

4. The cancellation circuit of claim 2, wherein the phase shifter performs phase inversion on the telephone signal corresponding to the pre-set transmission channel by control of the controller.

5. The cancellation circuit of claim 2, further comprising:
a power detector for detecting power of the telephone signal among output signals of the combiner.

6. The cancellation circuit of claim 5, further comprising:
an automatic gain control (AGC) amplifier for amplifying the telephone signal from the phase shifter based on the power of the telephone signal detected by the power detector and outputting the amplified telephone signal to the combiner.

7. The cancellation circuit of claim 5, wherein the noise cancellation controller controls phase shift in a frequency where a power value of the telephone signal is the minimum by changing a phase shift frequency of the phase shifter while monitoring the power of the telephone signal from the power detector.

8. The cancellation circuit of claim 1, wherein the telephone signal is a Global System for Mobile Communication (GSM) transmission signal that is in a frequency band ranging about 880 MHz to 915 MHz.

9. A digital broadcasting reception circuit, comprising:
a band-pass filter for passing a digital broadcasting signal as a reception signal;
a signal coupler for separating a part of the reception signal;
a telephone signal selection filter for passing a telephone signal among signals in the part of the reception signal from the signal coupler;
a phase shifter for performing phase inversion on the telephone signal from the telephone signal selection filter;
a combiner for combining the telephone signal from the phase shifter with the reception signal from the band-pass filter and canceling the telephone signal included in the reception signal; and
a Radio Frequency (RF) processor for receiving the digital broadcasting signal from the combiner.

10. The reception circuit of claim 9, further comprising:
a noise cancellation controller for controlling the cancellation of the telephone signal included in the reception signal based on a pre-set transmission channel among telephone frequency bands.

11. The reception circuit of claim 10, wherein the telephone signal selection filter includes a variation filter for setting up a pass band having a frequency of the pre-set transmission channel as a mean frequency by control of the controller.

12. The reception circuit of claim 10, wherein the phase shifter performs phase inversion on the telephone signal corresponding to the pre-set transmission channel by control of the controller.

13. The reception circuit of claim 9, further comprising:
a power detector for detecting power of the telephone signal among output signals of the combiner.

14. The reception circuit of claim 13, further comprising:
an automatic gain control (AGC) amplifier for amplifying the telephone signal from the phase shifter based on the power of the telephone signal detected by the power detector and outputting the amplified telephone signal to the combiner.

15. The reception circuit of claim 13, further comprising:
a noise cancellation controller for controlling phase shift in a frequency where a power value of the telephone signal is the minimum by changing a phase shift frequency of the phase shifter while monitoring the power of the telephone signal from the power detector.

16. The reception circuit of claim 9, wherein the telephone signal is a Global System for Mobile Communication (GSM) transmission signal that is in a frequency band ranging about 880 MHz to 915 MHz.

17. The reception circuit of claim 9, wherein the digital broadcasting signal is a digital video broadcasting handheld (DVB-H) signal which is in a frequency band ranging about 470 MHz to 860 MHz.

18. A portable digital broadcasting reception apparatus, comprising:
a main control unit for controlling a telephone call and digital broadcasting reception;
a telephone circuit for transmitting/receiving a telephone signal through a first antenna by control of the controller; and
a telephone signal cancellation circuit for receiving a digital broadcasting signal through a second antenna by control of the controller, performing phase inversion on the telephone signal included in a reception signal flowing through the second antenna, combining the phase-inverted telephone signal with the reception signal flowing through the second antenna, and canceling the telephone signal included in the reception signal.

19. The apparatus of the claim 18, further comprising:
a band-pass filter for passing the digital broadcasting signal as the reception signal from the second antenna to the telephone signal cancellation circuit; and
a Radio Frequency (RF) processor for receiving the digital broadcasting signal from the telephone signal cancellation circuit.

20. The apparatus of the claim 19, wherein the telephone signal cancellation circuit includes:
a signal coupler for separating a part of the reception signal flowing through the second antenna;
a telephone signal selection filter for passing the telephone signal among signals in the part of the reception signal from the signal coupler;
a phase shifter for performing phase inversion on the telephone signal from the telephone signal selection filter; and
a combiner for combining the telephone signal from the phase shifter with the reception signal, and canceling the telephone signal included in the reception signal.

21. The apparatus of the claim 20, wherein the telephone signal cancellation circuit further includes:
a noise cancellation controller for controlling the cancellation of the telephone signal included in the reception signal based on a pre-set transmission channel among the telephone frequency bands.

22. The apparatus of the claim 21, wherein the telephone signal selection filter includes a variation filter for setting up a pass band having a frequency of the pre-set transmission channel as a mean frequency by control of the controller.

23. The apparatus of the claim 21, wherein the phase shifter performs phase inversion on the telephone corresponding to the pre-set transmission channel by control of the controller.

24. The apparatus of claim 21, further comprising:
a power detector for detecting power of the telephone signal among output signals of the combiner.

25. The apparatus of claim 24, further comprising:
an automatic gain control (AGC) amplifier for amplifying the telephone signal from the phase shifter based on the power of the telephone signal detected by the power detector and outputting the amplified telephone signal to the combiner.

26. The apparatus of claim 24, wherein the noise cancellation controller controls phase shift in a frequency where a power value of the telephone signal is the minimum by changing a phase shift frequency of the phase shifter while monitoring the power of the telephone signal from the power detector.

27. The apparatus of claim 20, wherein the telephone signal is a Global System for Mobile Communication (GSM) transmission signal that is in a frequency band ranging about 880 MHz to 915 MHz.

28. The apparatus of claim 20, wherein the digital broadcasting signal is a digital video broadcasting handheld (DVB-H) signal which is in a frequency band ranging about 470 MHz to 860 MHz.

* * * * *